United States Patent
Ookawara et al.

(10) Patent No.: US 8,881,781 B2
(45) Date of Patent: Nov. 11, 2014

(54) PNEUMATIC TIRE

(75) Inventors: Takashi Ookawara, Tokyo (JP); Kenichi Shibata, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 16 days.

(21) Appl. No.: 12/867,657

(22) PCT Filed: Feb. 17, 2009

(86) PCT No.: PCT/JP2009/052689
§ 371 (c)(1),
(2), (4) Date: Aug. 13, 2010

(87) PCT Pub. No.: WO2009/104600
PCT Pub. Date: Aug. 27, 2009

(65) Prior Publication Data
US 2011/0011505 A1    Jan. 20, 2011

(30) Foreign Application Priority Data
Feb. 19, 2008  (JP) ................. 2008-037759

(51) Int. Cl.
*B60C 11/12* (2006.01)
*B60C 11/13* (2006.01)
*B60C 11/03* (2006.01)
*B60C 19/00* (2006.01)

(52) U.S. Cl.
CPC ......... *B60C 11/0302* (2013.01); *B60C 11/1369* (2013.01); *B60C 2011/0381* (2013.01); *B60C 2011/0388* (2013.01); *B60C 19/002* (2013.01)
USPC ................ 152/209.22; 152/209.27

(58) Field of Classification Search
CPC ............... B60C 11/1369; B60C 11/04; B60C 2011/0381
USPC ............ 152/209.22, 209.27, DIG. 3, 209.28, 152/209.19, 209.21, 209.18
See application file for complete search history.

(56) References Cited

U.S. PATENT DOCUMENTS

D77,644 S  * 2/1929  La Jone ............... D12/569
3,982,579 A  * 9/1976  Mirtain ............... 152/209.8
(Continued)

FOREIGN PATENT DOCUMENTS

EP  0 989 000 A2  3/2000
EP  1 964 691 A1  9/2008
(Continued)

OTHER PUBLICATIONS

International Search Report issued in PCT/JP2009/052689 dated May 26, 2009 (4 pages).
(Continued)

*Primary Examiner* — Justin Fischer
*Assistant Examiner* — Robert Dye
(74) *Attorney, Agent, or Firm* — Sughrue Mion, PLLC

(57) ABSTRACT

A pneumatic tire capable of reducing air column resonance arising from circumferential grooves without changing the shape of unilaterally open-ended lug grooves. Lug grooves 20 are formed in land portions 15, which are defined by the circumferential grooves, and each of the lug grooves 20 consists of a lateral groove portion 21, which extends axially to open at one end into the circumferential groove and communicate at the other end with a sub-groove 12 provided in the land portion 15, and an oblique groove portion 22, which extends in a direction intersecting with the tire axial and circumferential directions to communicate at one end with the sub-groove 12 and terminate at the other end within the land portion 15. Also, the lateral groove portion 21 of the lug groove 20 is provided with a projection 23 protruding toward the tread surface from the bottom of the lug groove 20 and having a height smaller than the height H of the land portion 15 as measured from the bottom of the lug groove 20.

3 Claims, 3 Drawing Sheets

(56) References Cited

U.S. PATENT DOCUMENTS

| | | | |
|---|---|---|---|
| 4,913,208 A * | 4/1990 | Anderson et al. | 152/209.18 |
| 5,109,903 A * | 5/1992 | Watanabe et al. | 152/209.15 |
| 5,135,038 A * | 8/1992 | Graas et al. | 152/209.18 |
| 5,361,815 A * | 11/1994 | Loser et al. | 152/209.19 |
| 5,421,387 A * | 6/1995 | Emerson | 152/209.9 |
| 6,371,180 B1 * | 4/2002 | Hayashi | 152/209.2 |
| 6,695,024 B2 * | 2/2004 | Neugebauer et al. | 152/209.22 |
| 7,025,100 B2 * | 4/2006 | Kimishima | 152/209.18 |
| 2003/0111150 A1 * | 6/2003 | Zimmer et al. | 152/209.19 |
| 2005/0076985 A1 | 4/2005 | Colombo et al. | |
| 2007/0000590 A1 * | 1/2007 | Murata | 152/209.8 |

FOREIGN PATENT DOCUMENTS

| | | | |
|---|---|---|---|
| EP | 2179868 A1 | 4/2010 | |
| JP | 7-172114 A | 7/1995 | |
| JP | 08183312 A * | 7/1996 | ............. B60C 11/11 |
| JP | 2000-118207 A | 4/2000 | |
| JP | 4408629 B2 | 11/2009 | |
| WO | 2007/072824 A1 | 6/2007 | |
| WO | WO 2007145177 A1 | 12/2007 | |

OTHER PUBLICATIONS

Supplementary European Search Report issued in Application No. 09711966.3 dated Oct. 31, 2011.

Chinese Office Action issued in Application No. 200980105442.X dated Jul. 2, 2012.

* cited by examiner

PNEUMATIC TIRE

TECHNICAL FIELD

The present invention relates to a pneumatic tire and, more particularly, to the reduction of tire noise arising from air column resonance in circumferential grooves formed in the tire tread.

BACKGROUND ART

In recent years, as vehicular operation has become quieter, noise arising from tires is an increasingly marked factor contributing to vehicular noise, and there is a growing demand for the reduction of it. Such tire noise is caused by a resonance phenomenon in the tube-shaped cavity formed between the tire and the road surface when a circumferential groove formed in the tire tread surface makes contact with the ground. Generally called air column resonance, this resonance occurs at a wavelength twice the length of an air column, namely, the length of the circumferential groove enclosed in the contact patch of a tire. Conventional methods for reducing this air column resonance are known to be based on the reduction of the number of circumferential grooves or the volume thereof.

Also, methods proposed for tires having circumferential grooves and unilaterally open-ended grooves, which open at one end into a circumferential groove and terminate at the other end within a land portion, are based on reducing the air column resonance through the scattering of it by changing the length and size of the unilaterally open-ended grooves or providing two kinds of unilaterally open-ended grooves having different volumes (see References 1 and 2, for instance).
Reference 1: Japanese Unexamined Patent Application Publication No. 61-125902
Reference 2: Japanese Unexamined Patent Application Publication No. 2007-45324

DISCLOSURE OF THE INVENTION

Problems to be Solved by the Invention

However, reduction in the number of the circumferential grooves or the volume thereof may result in a degradation of the draining function of the circumferential grooves, which in turn leads to a decrease in the tire's wet performance as is evident in the phenomenon of hydroplaning.

Also, any change in the length or size of the unilaterally open-ended grooves or in the volume thereof may cause a change in the stiffness of the land portion in which the unilaterally open-ended grooves are formed, and consequently there may arise a problem of an altered running performance.

The present invention has been made in view of these problems of the conventional art, and an object thereof is to provide a pneumatic tire that can reduce air column resonance arising from the circumferential grooves of a tire without changing the shape of the unilaterally opening lug grooves.

Means for Solving the Problem

A first aspect of the present invention provides a pneumatic tire which comprises a plurality of circumferential grooves extending along the circumferential direction of the tire on the surface of the tire tread and a plurality of land portions defined by the circumferential grooves. Also, at least one of the land portions has lug grooves formed in such a manner as to extend in a direction intersecting with the tire circumferential direction and to open at one end into a circumferential groove, and the lug grooves are each provided with a projection protruding toward the tread surface from the bottom of the lug groove. And the height of the projection is smaller than the depth of the lug groove.

A second aspect of the present invention provides a pneumatic tire which has the projection connected to the respective side faces on the lug groove side of circumferentially adjacent land portions defined by the lug grooves.

A third aspect of the present invention provides a pneumatic tire having the lug grooves which are each a unilaterally open-ended groove with the other end of it terminating within a land portion.

A fourth aspect of the present invention provides a pneumatic tire with land portions having the lug grooves, which have each a sub-groove narrower in groove width than the circumferential groove. The sub-groove extends in the tire circumferential direction and communicates with the lug grooves, and the projection is located between the sub-groove and the circumferential groove into which the lug groove opens.

Effect of the Invention

According to the present invention, a pneumatic tire has lug grooves formed in at least one of a plurality of land portions defined by circumferential grooves in such a manner as to extend in a direction intersecting with the tire circumferential direction and to open at one end thereof into a circumferential groove. And the lug grooves are each provided with a projection protruding toward the tread surface from the bottom thereof and having a height smaller than the depth of the lug groove. This arrangement changes the state of the vibration propagating from the circumferential groove to the lug groove, so that the air column resonance can be effectively reduced without changing the shape of the lug groove.

In such an arrangement, the projection may be connected to the respective side faces on the lug groove side of circumferentially adjacent land portions defined by the lug grooves. Then the stiffness of the land portions can be retained and thus the steering stability can be improved even when sub-grooves are formed or when the volume of lug grooves is large.

Also, the land portions may be rib-shaped land portions by the choice of unilaterally open-ended grooves for the lug grooves. Then the stiffness of the land portions can be enhanced and thus the steering stability can be improved.

Further, a sub-groove, narrower in groove width than the circumferential groove, extending in the tire circumferential direction and communicating with the lug grooves may be formed in the land portion provided with the lug grooves. Then the draining performance on the wet road can be improved also.

Figure 1:
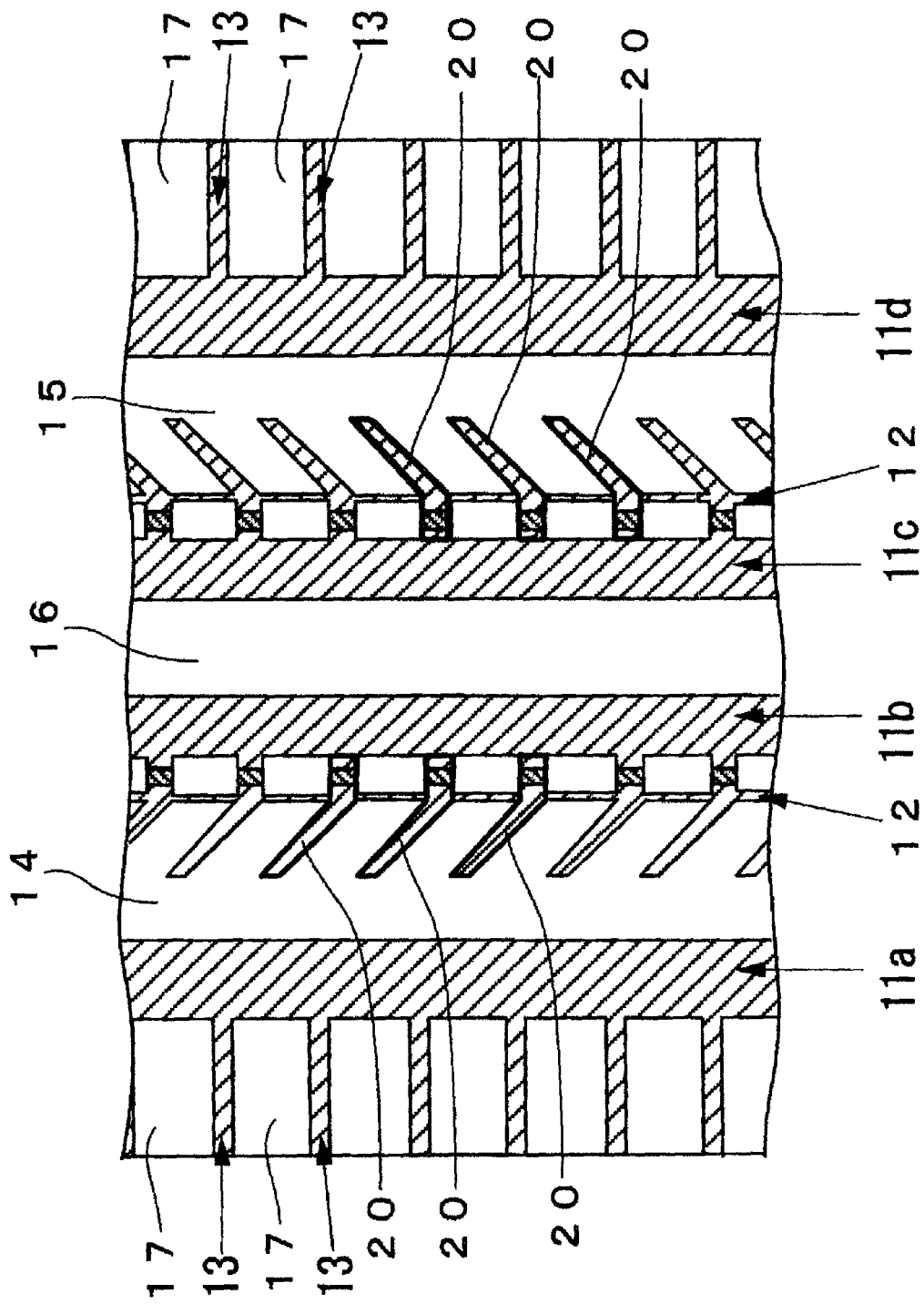
FIG. 1 is a developed view of a tread pattern of a pneumatic tire according to a preferred embodiment of the present invention.

REFERENCE NUMERALS 10 tread
11, 11a to 11d circumferential groove 12 sub-groove
13 shoulder lateral groove
14 first land portion
15 second land portion
15z block
16 central land portion
17 shoulder block
20 lug groove
21 lateral groove portion
22 oblique groove portion
23 Projection

BEST MODE FOR CARRYING OUT THE
INVENTION

Hereinbelow, preferred embodiments of the present invention will be described with reference to the accompanying drawings.

FIG. 1 is a developed view of a tread pattern of a pneumatic tire according to a preferred embodiment of the present invention, and FIG. 2 is an illustration showing an example of a lug groove according to the present invention. In each of the figures, 11 (11a to 11d) denotes a circumferential groove, 12 a sub-groove, 13 a shoulder lateral groove, 14, 15 a first land portion and a second land portion, 16 a central land portion, 17 a shoulder block, and 20 a lug groove.

The circumferential grooves 11a to 11d are each so formed as to extend in the tire circumferential direction on the surface of a tread 10. The first land portion 14 is defined by one (11a) of the circumferential grooves 11a to 11d, which is located at an axially outer position, and the circumferential groove 11b, which is located at an axially inner position adjacent to the circumferential groove 11a. The second land portion 15 is defined by the other circumferential groove 11d, which is located at an axially outer position, and the circumferential groove 11c, which is located at an axially inner position adjacent to the circumferential groove 11d. The central land portion 16 is defined by the circumferential groove 11b and the circumferential groove 11c.

The shoulder lateral groove 13 is a groove extending axially outward from the circumferential groove 11a or the circumferential groove 11d. The shoulder block 17 is defined by the circumferential groove 11a and the shoulder lateral grooves 13 or by the circumferential groove 11d and the shoulder lateral grooves 13.

The first land portion 14 and the second land portion 15 are respectively provided with a sub-groove 12 and lug grooves 20. Here a description is given of the sub-groove 12 and the lug grooves 20, using the second land portion 15 as an example.

The sub-groove 12 is a groove formed in the second land portion 15 such that it extends in the tire circumferential direction, and the groove width thereof is narrower than that of the circumferential groove 11c. In the present embodiment, the sub-groove 12 is formed in the second land portion 15 in a position closer to the circumferential groove 11c.

Figure 2A:
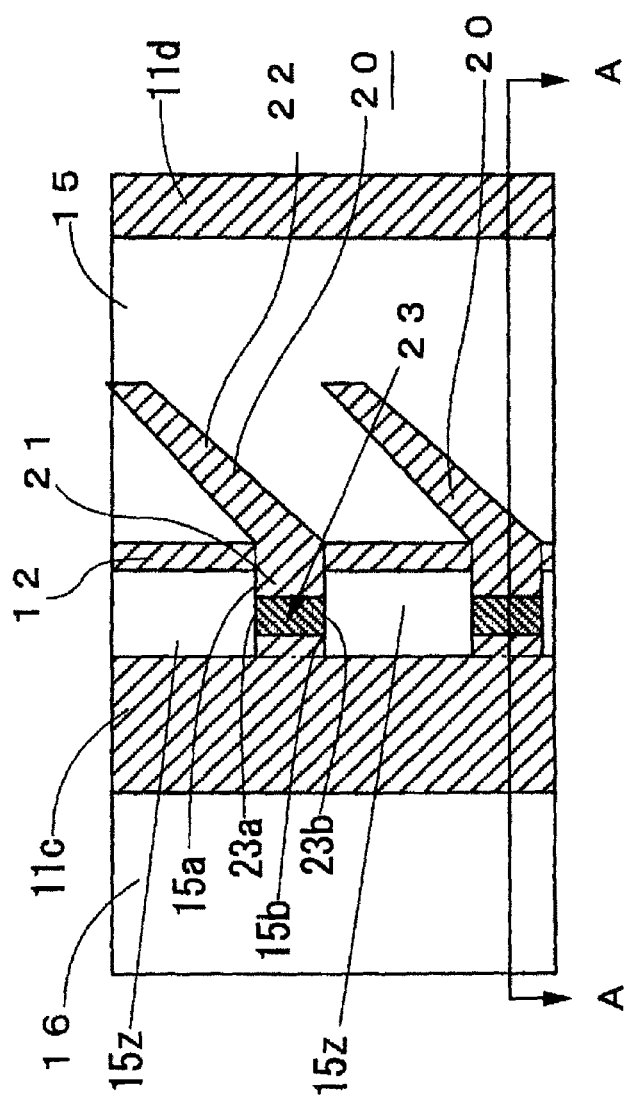
FIG. 2 is a schematic illustration showing an example of a lug groove according to the present invention.

The lug grooves 20, as shown in FIG. 2A also, are each a unilaterally open-ended groove having one end thereof opening into the circumferential groove 11c and the other end thereof terminating within the second land portion 15, which consists of a lateral groove portion 21 and an oblique groove portion 22. The lateral groove portion 21, which is a groove portion extending in the tire axial direction, has one end thereof opening into the circumferential groove 11c and the other end thereof communicating with the sub-groove 12. The oblique groove portion 22, which is a groove portion extending in such a manner as to intersect with both the tire axial and circumferential directions, has one end thereof communicating with the sub-groove 12 and the other end thereof terminating within the second land portion 15.

Figure 2B:
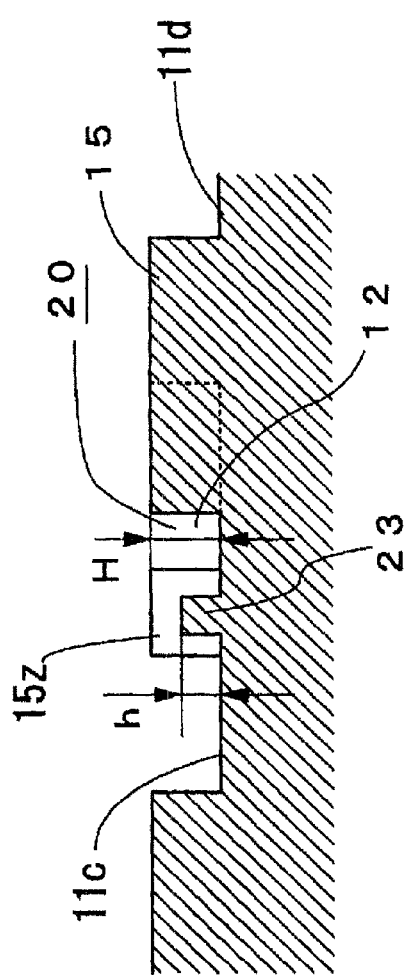

The lug grooves 20 according to the present invention are each provided with a projection 23 protruding toward the tread surface from the bottom of the lateral groove portion 21, which is the bottom of the lug groove 20. The projection 23 is formed in such a manner as to extend in the tire circumferential direction. As shown in FIG. 2B, the height h of the projection 23 is smaller than the depth of the lug groove 20, which is the height H of the second land portion 15 as measured from the bottom of the lug groove 20. Also, the ends 23a and 23b of the projection 23 are connected to the end faces of the second land portion 15, more specifically, the faces 15a and 15b substantially vertical to the tire circumferential direction of the respective blocks 15z which are each defined by the lateral groove portion 21, the sub-groove 12, and the circumferential groove 11c.

Note that the sub-groove 12 and the lug grooves 20 provided in the first land portion 14 are of the same features as the sub-groove 12 and the lug grooves 20 provided in the second land portion 15.

Next, a description will be given of the workings of the present invention.

When a circumferential groove makes contact with the ground as the tire rotates, air enters into a tube-shaped cavity of the contact length of the circumferential groove enclosed in the contact patch of the tire. As a result, an air column resonance occurs at a wavelength of twice the above-mentioned length of the circumferential groove. The present embodiment, however, makes it possible to absorb the sound of this frequency by the lug grooves (unilaterally open-ended grooves) 20 which open at one end thereof into a circumferential groove 11 and communicate with a sub-groove 12.

Normally, the lug grooves 20 are so designed as to allow no decrease in excess of a certain degree of the stiffness of the first and second land portions 14 and 15 including the blocks 15z so that the tire's driving and braking performance on the wet road surface may be ensured and the steering stability assured. Consequently, there are cases where the air column resonance cannot be absorbed fully by the lug grooves 20 alone.

According to the present embodiment, therefore, the air column resonance is reduced through the scattering of it by providing a projection 23 which protrudes toward the tread surface from the bottom in the lateral groove portion 21 of the lug groove 20. With the lateral groove portion 21 communicating with the circumferential groove 11c and the sub-groove 12, the vibration propagates from the circumferential groove 11c to the lug groove 20. However, the lug groove 20 of the present embodiment has the projection 23 in the lateral groove portion 21, which causes changes in area in the tire axial direction for the propagation path of the vibration. That is, the groove depth in the section of the lug groove 20 communicating with the circumferential groove 11 is equal to the height H of the second land portion 15 (or the first land portion 14). However, the groove depth at the projection 23 is (H-h) where h is the height of the projection, and it is again the height H past the projection 23. This arrangement brings about the scattering of the air column resonance such that the air column resonance can be reduced without changing the shape of the lug groove 20.

It is to be noted that the sub-groove 12, which is provided to improve the draining characteristics of the tire, forms an air column when the tire makes contact with the ground. Yet, the sub-groove 12, because of the narrow groove width and the small volume, little contributes to the production of the air column resonance. However, provision of the sub-grooves 12 results in the formation of blocks 15z, which are discontinuous in the tire circumferential direction, in the second land portion 15 (or the first land portion 14), and this leads to a degradation of stiffness of the second land portion 15 (or the first land portion 14). In the present embodiment, the configuration, in which the projection 23 is connected to the blocks 15z, works to reduce the degradation of stiffness of the second land portion 15 (or the first land portion 14) which can otherwise result from the provision of the sub-grooves 12.

Thus, according to the preferred embodiment of the present invention, lug grooves 20 are formed in the first and second land portions 14 and 15 which are defined by the circumferential grooves 11, and the lug grooves 20 are each provided with a lateral groove portion 21, which has one end thereof opening into the circumferential groove 11 and the other end thereof communicating with the sub-groove 12 provided in the first and second land portions 14 and 15, and an oblique groove portion 22, which extends in such a manner as to intersect with both the tire axial and circumferential directions and has one end thereof communicating with the sub-groove 12 and the other end thereof terminating within the first and second land portions 14 and 15. Also, the lateral groove portion 21 of the lug groove 20 is provided with a projection 23 protruding toward the tread surface from the bottom of the lug groove 20 and having a height h smaller than the height H of the first and second land portions 14 and 15 as measured from the bottom of the lug groove 20. Thus, the state of the vibration propagating from the circumferential groove to the lug groove is changed such that the air column resonance can be effectively reduced without changing the shape of the lug groove 20.

In the above preferred embodiment, a description has been given of a pneumatic tire having a tread pattern symmetrical with respect to the center line of tire width. However, the present invention is not limited to such a pneumatic tire only. The invention is applicable to any pneumatic tire having a different tread pattern so long as it is provided with lug grooves (unilaterally open-ended grooves) 20 which have each one end thereof opening into a circumferential groove and the other end thereof terminating within a land portion.

The present invention also provides the same advantageous effects for pneumatic tires provided with two or more types of lug grooves, rather than a single type of lug grooves 20 as described above.

Also, the shape of a lug groove 20 may be such that it is not provided with both the lateral groove portion 21 and the oblique groove portion 22 and that the oblique groove portion 22 opens directly into the circumferential groove.

EXAMPLE

Figure 3:
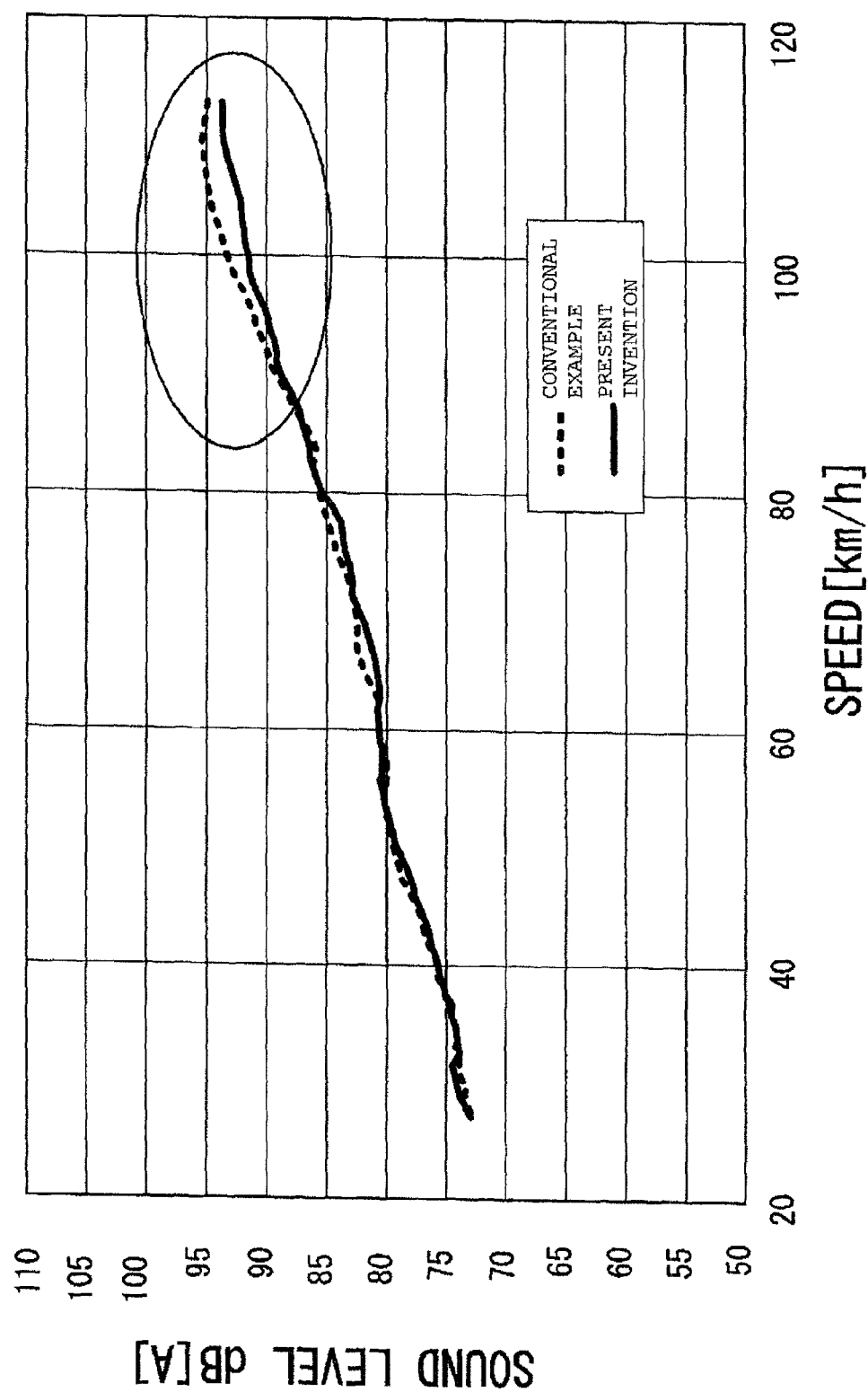
FIG. 3 is a graph showing the results of measurement of tire noise.

The graph of FIG. 3 shows the results of evaluation of tire noise conducted on a tire having a projection formed within each lug groove according to the present invention (Present Invention) and a conventional tire without the projection formed within each lug groove (Conventional Example).

The tire size used was 205/55R16, and the tires were each mounted on the rim of 6.5J. The internal pressure of the tires then was 220 kPa.

In the evaluation of tire noise, the test tire was run on a rotating drum whose speed was changed from 25 to 115 km/h, and the sound pressure of noise produced by the tire at each speed was measured with a microphone which was moved forward and backward for a distance of 1 meter each at a point 2 m away from the tire in the tire lateral direction and at a height of 0.25 m. In this running test, the load applied to each of the tires was 4.3 kN.

As is clear from the graph of FIG. 3, the tire of the present invention, in contrast to the tire of the conventional example, showed the effects of sound pressure reduction of about 1 dB(A) in the speed region of 70 to 110 km/h.

As a result, it has been confirmed that the noise level can be lowered by the provision of a projection in each of the lug grooves which scatters the air column resonance.

It should be understood by those skilled in the art that various modifications and variations can be made to this invention without departing from the scope of the invention. Accordingly, the invention is intended to include all such modifications and variations as fall within the scope of the appended claims and the equivalents thereof.

INDUSTRIAL APPLICABILITY

As described herein, according to the present invention, the air column resonance arising from the circumferential grooves of a tire can be reduced without changing the shape of the lug grooves. Hence, a pneumatic tire producing less noise can be provided while ensuring adequate steering stability and wet performance of the tire.

The invention claimed is:
1. A pneumatic tire comprising:
at least three circumferential grooves extending along a circumferential direction of the tire on the surface of a tire tread; and
a plurality of land portions defined by circumferential grooves,
wherein at least one of the land portions defined by two circumferential grooves, being rib-shaped land portion and extending in the circumferential direction of the tire continuously has lug grooves formed in such a manner as to extend in a direction intersecting with the tire circumferential direction, to open at one end thereof into a circumferential groove positioning on a width direction inwardly of the tire and to terminate at the other end,
wherein the lug groove extends in the axial direction of the tire and comprises a lateral groove whose one end opens in the circumferential direction inwardly and an oblique groove portion, whose one end communicates with the lateral groove and the other end terminates within the land portion, extends so as to intersect with both the tire axial and circumferential directions,
wherein the lateral groove of the lug grooves are each provided with a projection protruding toward the tread surface from the bottom thereof, the height thereof being smaller than the depth of the lug groove,
wherein a groove depth of the lug groove in a section of communicating with the circumferential groove and a groove depth of the lug groove on a terminal side than the projection is equal to a groove depth of a circumferential groove on the side where the lug groove opens and;
wherein the projection is connected to respective side faces on the lug groove side of circumferentially adjacent land portions defined by lug grooves.
2. The pneumatic tire according to claim 1, wherein the land portions having the lug grooves have each a sub-groove narrower in groove width than the at least three main circumferential grooves, the sub-groove extending in the tire circumferential direction and communicating with the lateral groove and the oblique groove portion of the lug grooves and wherein the projection is located between the sub-groove of the lateral groove and the main circumferential groove into which the lug groove opens.

3. The pneumatic tire according to claim 1, wherein the land portions having the lug grooves have each a sub-groove narrower in groove width than the at least three main circumferential grooves, the sub-groove extending in the tire circumferential direction and communicating with the lug grooves and wherein the projection is located between the sub-groove and the main circumferential groove into which the lug groove opens.

* * * * *